Nov. 19, 1957   L. B. COURTOT   2,813,730
HOSE COUPLING WITH CONTRACTABLE METALLIC WIRE SLEEVE
Filed July 14, 1954

INVENTOR.
LOUIS B. COURTOT
BY
RICHEY, WATTS, EDGERTON & McNENNY
ATTORNEYS

United States Patent Office 2,813,730
Patented Nov. 19, 1957

2,813,730

HOSE COUPLING WITH CONTRACTABLE METALLIC WIRE SLEEVE

Louis B. Courtot, Cleveland, Ohio, assignor to The Weatherhead Company, Cleveland, Ohio, a corporation of Ohio Application July 14, 1954, Serial No. 443,218

2 Claims. (Cl. 285—242)

This invention relates to hose couplings and more particularly to a metal fitting which may be quickly and easily attached to the end of a hose and which will securely hold the fitting to the hose when subjected to high pressures.

Numerous attempts have been made to provide a hose coupling or "hose end" which would not require the use of special tools or fixtures for securing the hose coupling to the hose. One of the common failures of hose couplings heretofore available involves the blow-out or pullout separation of the hose from the metal fitting in response to hydraulic pressures which are lower than the pressures required to burst the hose. The rubber or rubber-like material of the hose is characterized by a cold flow under pressure so that even though the hose is securely clamped between rigid metal parts when first assembled, the cold flow in the hose tends to accommodate the metal parts over a period of time. The result is a progressive reduction in the grip between the rigid metal parts on the hose material.

It is among the objects of my invention to provide a hose coupling having a nipple adapted to be received within the hose and a flexible sleeve around the hose arranged so that any movement of the hose away from the coupling is utilized to grip the hose more tightly to the nipple.

It is a further object of my invention to provide a hose coupling according to the preceding object wherein the grip of the hose on the nipple is increased in proportion to the axial movement of the hose longitudinally with respect to the nipple.

It is a further object of my invention to provide a hose coupling having a nipple adapted to be inserted within the end of the hose and having a woven metallic sleeve surrounding the hose which metallic sleeve is reduced in diameter in response to elongation of the sleeve caused by pull on the hose away from the nipple.

Figure 1:
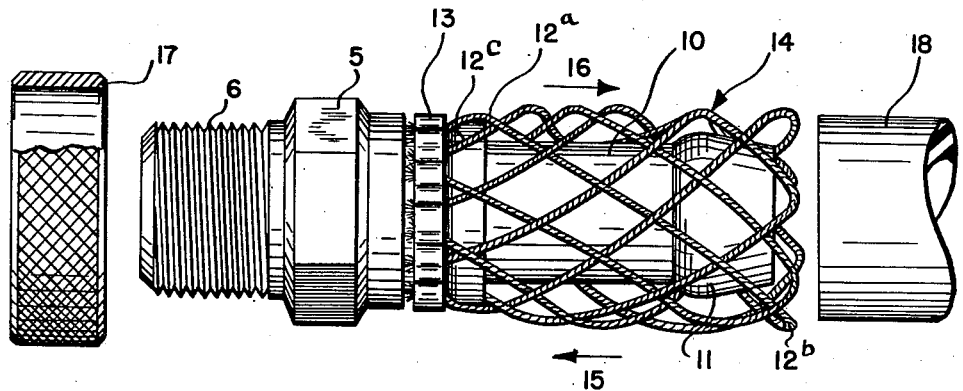
Figure 2:
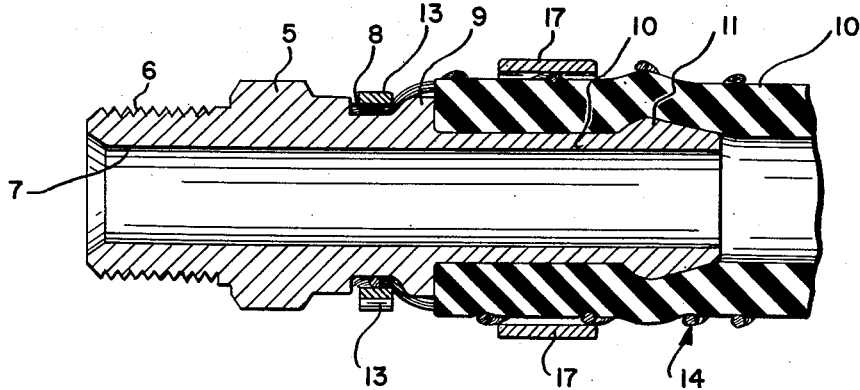

Further objects and advantages will appear from the following description and the appended drawings; wherein:

Fig. 1 is an exploded view showing a clamping ring, the hose coupling body and the end of a section of hose in unassembled relation; and Fig. 2 is a sectional view showing the hose coupling according to the present invention assembled in operative position on the end of the hose.

Referring to the drawings, the hose coupling comprises a body 5 which may be machined from bar stock and which is exteriorly threaded as at 6 for attachment to a valve or the like (not shown). The body 5 is provided with an interior bore 7 and the maximum diameter of the body is provided with a polygonal form to facilitate the securing of the hose coupling in a hydraulic system. An annular groove 8 is provided to receive and anchor the free ends of metallic wire cable strands which form the gripping sleeve of the coupling according to my invention. Adjacent the groove 8 is provided a shoulder 9 against which the end of the hose is arranged to abut as the nipple 10 is inserted within the hose. The outer end of the nipple is provided with an enlargement 11 so that an annular chamber is formed between the nipple and the sleeve which chamber has a reduced cross section adjacent the nipple enlargement 11.

The sleeve portion 14 of the hose coupling is made up of separate strands of wire cable woven in the form of a tube. This is accomplished by taking a strand having an end such as 12a at the top of the coupling, bringing the strand to a loop as at 12b on the underside of the coupling at the end of the nipple and thence back to the top of the fitting as at 12c where the free ends 12a and 12c of the strand are clamped in the groove 8 by a crimped metallic ring 13. The next adjacent strands are similarly fashioned about the nipple and are interwoven with the other strands as they form a cylindrical sleeve concentric of the nipple. This type of basket weave in the form of a cylinder results in a sleeve structure which will increase in diameter when the sleeve is urged in the direction of the arrow 15. Conversely, when the sleeve 14 is moved in the direction of the arrow 16 it is decreased in diameter. This diameter change characteristic of this type of basket weave construction is utilized in the present fitting to convert any longitudinal pull on the hose to a force effective to reduce the interior diameter of the sleeve and thus more securely clamp the end of the hose to the coupling.

To assemble the coupling on the end of the hose, the ring 17 is removed from the sleeve portion of the coupling and the interior diameter of the sleeve 14 is increased by axially pressing the sleeve in the direction of the arrow 15. In this position the strands of wire cable which form the sleeve are substantially out of contact with the hose 18 as the hose is forced in over the nipple 10. When the end of the hose 18 has abutted the shoulder 9 of the body 5, the clamping ring 17 is slipped over the sleeve and manually pulled in the direction of the arrow 16. This causes the strands of wire cable which make up the sleeve to be embedded slightly within the outer surface of the hose 18 as shown in Fig. 2 and the pull in the direction of the arrow 16 reduces the interior diameter of the sleeve 14 so as to clamp the end of the hose tightly against the exterior of the nipple 10. When the hose coupling is in use and the hose subjected to pressure any movement of the hose with respect to the fitting in the direction of the arrow 16 results in a corresponding decrease in the diameter of the sleeve 14 which increases the grip of the sleeve and the hose on the nipple 10.

Whenever it is desired to remove the coupling from the hose, the ring 17 is moved in the direction of the arrow 15 and the sleeve 14 may have its interior diameter increased by moving the sleeve in the direction of the arrow 15. In the absence of any clamping pressure exerted by the sleeve 14 and by maintaining the sleeve 14 in its relaxed or large diameter condition, the hose may be pulled off of the nipple 10.

Although the nipple 10 and the nipple enlargement 11 are shown as being smooth and rounded in the preferred form illustrated, I am aware that the grip between the interior of the hose 18 and the fitting may be improved in some instances by threading, corrugating or otherwise roughening the exterior of the nipple 10 and/or its enlargement 11.

Although I have described one form of my invention in considerable detail, it will be understood by those skilled in the art that numerous modifications may be made without departing from the scope of the invention as defined in the following claims:

What is claimed is:

1. A hose coupling comprising a body having an axial bore therethrough, one end of said body being threaded and the opposite end thereof being provided with a radial hose abutting shoulder, said opposite end provided with an integrally formed axially projecting nipple, said nipple having a bore therethrough coaxial with the bore of the body, said nipple having a rounded enlargement at the end thereof remote from the body, said body being provided with an outwardly open annular groove, a metallic sleeve of interwoven strands of wire in cylindrical form telescoped on the end of said body and having one end portion disposed in said groove, a clamping band around said sleeve in said groove to anchor the sleeve to the body, each of said strands having both free ends thereof disposed between said clamping band and the body, and having the intermediate portion of each strand terminating in a return bend at the opposite side of said body, said sleeve projecting axially of the body and terminating adjacent said nipple enlargement to provide an annular space between the shoulder and the nipple enlargement to receive the end of a length of hose, and an axially movable, relatively wide, clamping band having a substantially cylindrical inner surface with an internal diameter greater than the diameter of said body and said clamping band and smaller than the diameter of said sleeve when on said hose, said band being axially movable from a position around said body to a position around said sleeve between said shoulder and enlargement to engage the sleeve and pull the same axially to force said strands into the outer surface of the hose and pull the sleeve axially in a direction away from said shoulder to reduce the diameter of said sleeve.

2. A hose coupling according to claim 1 wherein the portion of said sleeve between said clamping bands is under axial tension to effect a radial contraction thereof for gripping said hose.

References Cited in the file of this patent

UNITED STATES PATENTS

| | | |
|---|---|---|
| 1,294,921 | Lewis | Feb. 18, 1919 |
| 1,630,895 | Herbst | May 31, 1927 |
| 2,198,996 | Guarnaschelli | Apr. 30, 1940 |
| 2,279,237 | Kellems et al. | Apr. 7, 1942 |
| 2,614,304 | Oetiker | Oct. 21, 1952 |
| 2,681,781 | Kellems | June 22, 1954 |
| 2,750,210 | Trogdon | June 12, 1956 |